(12) United States Patent
Wen et al.

(10) Patent No.: US 9,226,190 B2
(45) Date of Patent: Dec. 29, 2015

(54) RADIO STATION, ROUTING METHOD AND RADIO COMMUNICATION SYSTEM

(71) Applicant: FUJITSU LIMITED, Kawasaki-shi, Kanagawa (JP)

(72) Inventors: Yun Wen, Kawasaki (JP); Hiroshi Fujita, Yokosuka (JP); Makoto Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 14/071,221

(22) Filed: Nov. 4, 2013

(65) Prior Publication Data

US 2014/0056129 A1 Feb. 27, 2014

Related U.S. Application Data

(63) Continuation of application No. PCT/JP2011/062423, filed on May 30, 2011.

(51) Int. Cl.
| | |
|---|---|
| H04W 4/00 | (2009.01) |
| H04L 12/66 | (2006.01) |
| H04W 28/02 | (2009.01) |
| H04W 40/12 | (2009.01) |
| H04L 12/803 | (2013.01) |
| H04L 12/721 | (2013.01) |
| H04L 12/729 | (2013.01) |

(52) U.S. Cl.
CPC ............ *H04W 28/021* (2013.01); *H04L 47/122* (2013.01); *H04W 40/12* (2013.01); *H04L 45/123* (2013.01); *H04L 45/125* (2013.01)

(58) Field of Classification Search
CPC .............................. H04L 45/124; H04W 40/12
See application file for complete search history.

(56) References Cited

U.S. PATENT DOCUMENTS

| | | | |
|---|---|---|---|
| 5,649,108 A * | 7/1997 | Spiegel et al. | ................. 709/241 |
| 7,620,010 B2 | 11/2009 | Takeda et al. | |
| 8,611,251 B2 * | 12/2013 | Subramanian et al. | ........ 370/254 |
| 2008/0298251 A1 | 12/2008 | Khuu et al. | |

(Continued)

FOREIGN PATENT DOCUMENTS

| | | |
|---|---|---|
| EP | 1587262 A2 | 10/2005 |
| EP | 2109336 A1 | 10/2009 |

(Continued)

OTHER PUBLICATIONS

International Search Report, mailed in connection with PCT/JP2011/062423 and mailed Aug. 30, 2011.

(Continued)

*Primary Examiner* — Melanie Jagannathan
(74) *Attorney, Agent, or Firm* — Fujitsu Patent Center

(57) ABSTRACT

A radio station includes a weighting factor determining unit that outputs a value larger than one as a weighting factor when a traffic amount of an adjacent radio station positioned in a communicable range of the radio station exceeds a certain threshold, and a cost calculating unit that calculates a radio quality cost based on radio quality for each link between the radio station and each adjacent radio station, regards a multiplication result of the obtained radio quality cost and the weighting factor as a link cost when there is an input of the weighting factor from the weighting factor determining unit, and regards the obtained radio quality cost as a link cost when there is no input of a weighting factor from the weighting factor determining unit.

11 Claims, 6 Drawing Sheets

(56) References Cited

U.S. PATENT DOCUMENTS

2010/0074194 A1* 3/2010 Liu et al. .................. 370/329
2010/0172249 A1   7/2010 Liu

FOREIGN PATENT DOCUMENTS

| JP | 2005-303827 | 10/2005 |
| JP | 2008-301444 | 12/2008 |
| JP | 2010-518745 | 5/2010 |
| WO | 2007053141 | 5/2007 |

OTHER PUBLICATIONS

EESR—Extended European Search Report of European Patent Application No. 11866989.4 mailed Mar. 31, 2015.

Ye et al.; "Use of Congestion-Aware Routing to Spatially Separate TCP Connections in Wireless Ad Hoc Networks"; 2004 IEEE International Conference on Mobile Ad-hoc and Sensor Systems; Oct. 25, 2004; pp. 389-397; IEEE. [XP010765248].

* cited by examiner

RADIO STATION, ROUTING METHOD AND RADIO COMMUNICATION SYSTEM

CROSS-REFERENCE TO RELATED APPLICATION

This application is a continuation of International Application No. PCT/JP2011/062423, filed on May 30, 2011 and designating the U.S., the entire contents of which are incorporated herein by reference.

FIELD

The present invention relates to a radio station in a wireless ad hoc network and a routing method by the radio station.

BACKGROUND

In a wireless ad hoc network, each radio station exchanges routing information packets including routing information to a destination radio station with adjacent radio stations existing in a communicable range of the own station, and thus constructs a route from the own station to the destination radio station. For example, when a radio station constructs a plurality of routes to a destination radio station, the radio station selects a route with the lowest routing cost as an optimum route, and performs data transmission using the selected route. The above-mentioned routing cost is a total amount of link costs that are costs in accordance with radio quality of respective links on a route. However, in such a routing construction scheme, the route selection in consideration of traffic conditions is not performed. Thus, it is possible that traffic is concentrated at a certain radio station and the radio station becomes a bottleneck in the network. Moreover, in case of a tree-formed network, for example, traffic is concentrated at a certain radio station (radio station near the top).

Moreover, in the wireless ad hoc network, a radio station confirms a free state of a channel through carrier sense before performing data transmission. Then, when electric power higher than a given threshold is detected, the radio station determines that the channel is busy and does not perform data transmission. When electric power higher than a given threshold is not detected, the radio station determines that the channel is idle and starts data transmission. However, in the wireless ad hoc network, when a transmission radio station transmits data to a reception radio station as a destination at the same time as a radio station as a hidden node for the transmission radio station performs data transmission, data collision (a hidden node problem) occurs at the reception radio station. Thus, a transmission success rate deteriorates in the transmission radio station, and the communication capacity accordingly decreases. In particular, at the bottleneck radio station on a route constructed in the routing construction scheme described above, reception failure due to the hidden node problem occurs frequently, and the number of times of retransmission due to the reception failure increases, which further increases traffic. Thus, the communication capacity in the entire network decreases.

Meanwhile, a technique has been disclosed that allows routing construction avoiding a radio station where traffic is concentrated (a bottleneck radio station) in the routing construction scheme described above. To be more specific, each radio station calculates a link cost using a node cost in accordance with traffic conditions of the own station and a cost in accordance with radio quality of a link. Then, each radio station generates a routing cost to the own station by adding the link cost obtained from calculation to a routing cost in a received routing information packet, and transmits the routing information packet including the routing cost to adjacent radio stations. That is, each radio stations in the wireless ad hoc network exchanges routing information packets including the routing cost reflecting traffic conditions of the own station with adjacent radio stations. In this manner, the routing cost of a route including a bottleneck radio station becomes higher, and thus each radio station can perform routing construction avoiding a bottleneck radio station in the routing construction scheme described above.

Patent Document 1: Japanese Patent Application Laid-open No. 2005-303827

However, the conventional technique described above has a problem in which it is difficult to solve the above-mentioned hidden node problem when the bottleneck radio station is a destination radio station or a radio station that is inevitable on a route (radio station near the top of a tree-formed network, for example). That is, when it is impossible to construct a route avoiding a bottleneck radio station, reception failure due to the hidden node problem occurs frequently at the bottleneck radio station, and the number of times of retransmission increases due to the reception failure, which increases traffic. Thus, the communication capacity in the entire network decreases.

SUMMARY

According to an aspect of an embodiment of the invention, a radio station selects a route whose routing cost to a destination that is a total amount of link costs is lowest as an optimum route in an ad hoc network. The radio station includes a weighting factor determining unit that outputs a value larger than one as a weighting factor when a traffic amount of an adjacent radio station positioned in a communicable range of the radio station exceeds a certain threshold, and a cost calculating unit that calculates a radio quality cost based on radio quality for each link between the radio station and each adjacent radio station, regards a multiplication result of the obtained radio quality cost and the weighting factor as a link cost when there is an input of the weighting factor from the weighting factor determining unit, and regards the obtained radio quality cost as a link cost when there is no input of a weighting factor from the weighting factor determining unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

The following describes embodiments of a radio station, a routing method, a radio communication system, and a computer program for routing that are disclosed in the present application in detail based on the drawings. Note that the embodiments do not limit the present invention.

[a] First Embodiment

Figure 1:
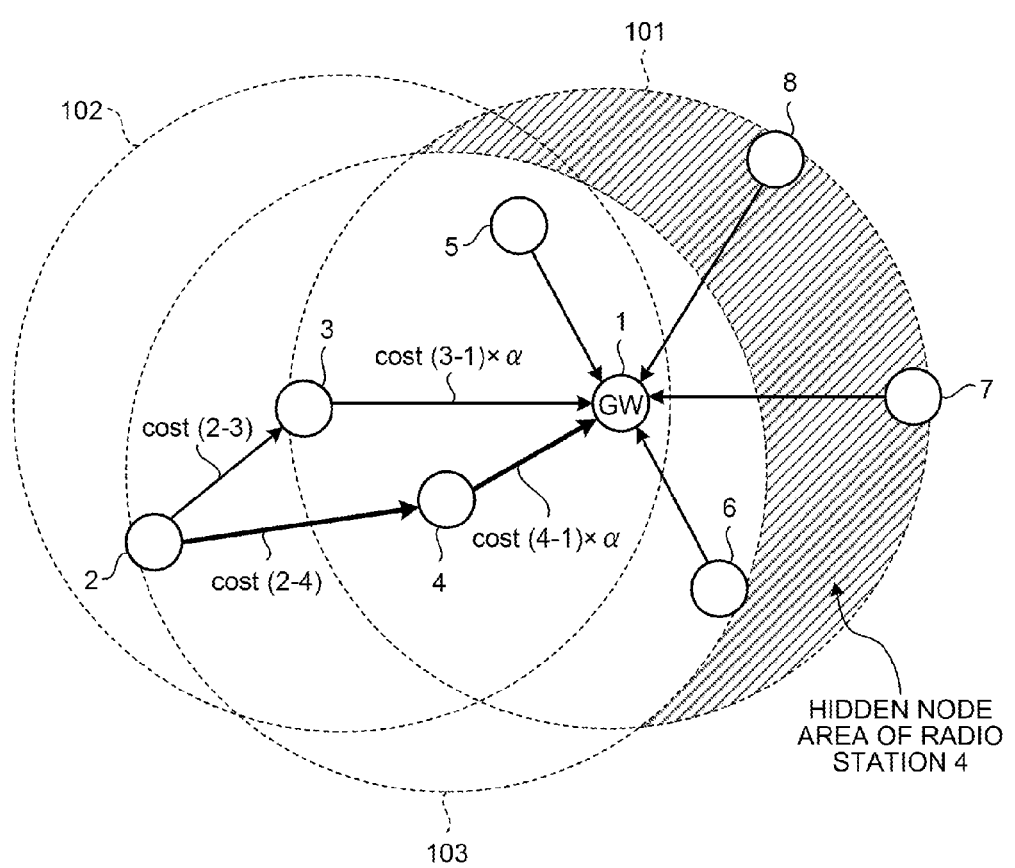
FIG. 1 is a diagram schematically illustrating a routing method in a wireless ad hoc network.

FIG. 1 is a diagram schematically illustrating a routing method of an embodiment in a wireless ad hoc network. The wireless ad hoc network illustrated in FIG. 1 includes a gateway (GW) radio station 1 and other radio stations 2 to 8, and supposes a network in which each radio station is arranged in a tree form with the GW radio station 1 as the center. FIG. 1 illustrates communicable ranges of the GW radio station 1, the radio station 3, and the radio station 4 (101, 102, 103), as an example. In the wireless ad hoc network, each radio station exchanges routing information packets including a routing cost to the own station with adjacent radio stations existing in a communicable range of the own station. In this manner, each radio station constructs a route from a destination radio station to the own station. For example, when the radio station 2 constructs a plurality of routes to the GW radio station 1, the radio station 2 selects a route with the lowest routing cost as an optimum route, and performs data transmission using the selected route.

Note that the embodiment describes a case in which the GW radio station 1 is a bottleneck radio station and acts as a destination radio station or a radio station that is inevitable on a route, as an example.

Figure 2:
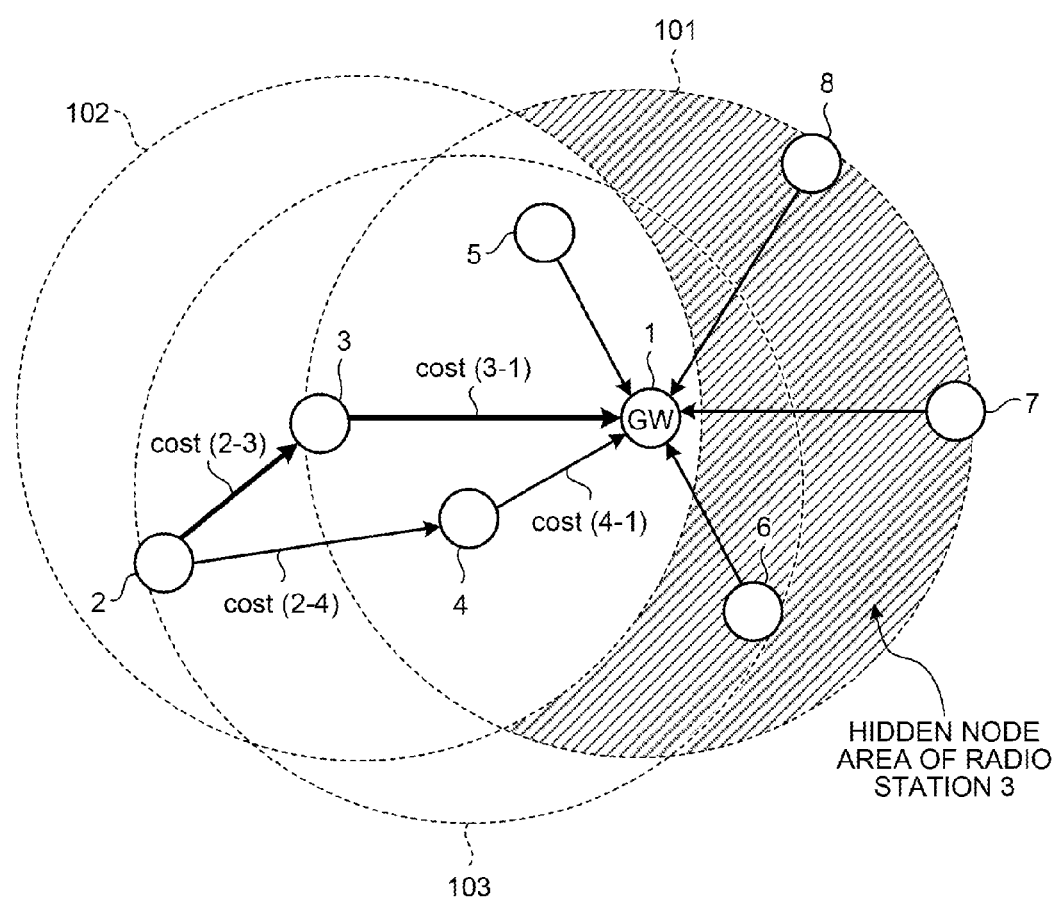
FIG. 2 is a diagram schematically illustrating a conventional routing method.

Here, a conventional routing method is described before explaining a routing method of the embodiment. FIG. 2 is a diagram schematically illustrating a conventional routing method. Note that in FIG. 2, the arrangement of the GW radio station 1 and the other radio stations 2 to 8, and the communicable ranges of the GW radio station 1, the radio station 3, and the radio station 4 (101, 102, 103) are the same as in FIG. 1. Moreover, the part with oblique lines in FIG. 1 represents a hidden node area of the radio station 4, and the part with oblique lines in FIG. 2 represents a hidden node area of the radio station 3.

For example, to construct a route to the GW radio station 1 in the network illustrated in FIG. 2, the GW radio station 1 broadcasts a routing information packet first. The radio stations 3 to 8 in the communicable range 101 of the GW radio station 1 receive the routing information packet. Each of the radio stations 3 to 8 having received the routing information packet calculates a routing cost to the GW radio station 1, and stores the routing cost in a routing information packet to broadcast it.

Moreover, the radio station 2 having received the routing information packet from each radio station positioned in a communicable range of the own station (corresponding to the radio stations 3 and 4 in FIG. 2) calculates link costs based on radio quality of links to the radio stations. Then, the radio station 2 adds each link cost to the routing cost in the routing information packet used for the calculation of the link cost, and regards a route with the lowest total routing cost as an optimum route. To be more specific, the radio station 2 compares a first routing cost obtained by adding a link cost cost (2-3) to a routing cost cost(3-1) in the routing information packet transmitted by the radio station 3 with a second routing cost obtained by adding a link cost cost(2-4) to a routing cost cost(4-1) in the routing information packet transmitted by the radio station 4. As a result of the comparison, the radio station 2 regards the route with the lower cost as an optimum route. In the example of FIG. 2, the first routing cost is lower than the second routing cost. Thus, the radio station 2 selects the route (2-3-1) as an optimum route (refer to a bold line in FIG. 2). Thereafter, the radio station 2 stores the routing cost of the route (2-3-1) to the GW radio station 1 into the routing information packet, and broadcasts it. In the manner above, each radio station exchanges routing information packets with adjacent radio stations, and thus constructs a route from a destination radio station to the own station.

However, in the above-mentioned conventional routing method illustrated in FIG. 2, the routing construction in consideration of traffic conditions is not performed. Thus, it is possible that traffic is concentrated at a certain radio station and the radio station becomes a bottleneck in the network. The GW radio station 1 in FIG. 2 is a destination radio station or a radio station that is inevitable on a route, and thus traffic is concentrated thereat. Furthermore, at the bottleneck radio station where traffic is concentrated, reception failure due to the hidden node problem occurs frequently, and the number of times of retransmission due to the reception failure increases. Thus, the traffic increases in the entire network, and the communication capacity decreases.

For example, in the network illustrated in FIG. 2, the radio station 2 constructs a route based on the total value of link costs failing to reflect traffic conditions, that is, link costs obtained based on the radio quality of links. Consequently, when the routing cost of the route (2-3-1) is lower than the routing cost of the route (2-4-1), the radio station 2 selects the radio station 3 as a relay radio station, as described above, regardless of traffic conditions. However, the radio quality of the link between the radio station 3 and the GW radio station 1 is worse than that of the link between the radio station 4 and the GW radio station 1 because the distance is larger. Moreover, in FIG. 2, the radio station 4 has two hidden nodes of the radio stations 7 and 8, while the radio station 3 has three hidden nodes of the radio stations 6, 7, and 8. Thus, the route including the radio station 3 as a relay radio station is more likely to be influenced by hidden terminals. That is, on the link between the radio station 3 and the GW radio station 1, reception failure due to the hidden node problem occurs frequently, and thus the data communication speed decreases due to the increase of retransmission. Furthermore, the increase of retransmission due to the hidden node problem increases the amount of interference to transmission from another radio station to the GW radio station 1, which decreases the communication capacity of the network.

Thus, in the embodiment, each radio station in a wireless ad hoc network performs routing construction in consideration of traffic conditions. To be more specific, each radio station performs weighting in accordance with traffic conditions of an adjacent radio station on a cost obtained based on radio quality (hereinafter, referred to as radio quality cost) of a link with the adjacent radio station to which a routing information packet is transmitted, and regards the result as a link cost. For example, in the embodiment, each radio quality cost is multiplied by a weighting factor so that differences in radio quality costs of links between respective radio stations and a bottleneck radio station are large. The weighting factor is the same value among radio stations and larger than one. Next, each radio station adds the link cost obtained by the multiplication of the weighting factor to a routing cost in a routing information packet used for the calculation of the link cost to calculate a routing cost to the own station. Then, each radio station performs the processing above for all of the adjacent radio stations, and selects a route with the lowest routing cost from a destination radio station to the own station as an optimum route.

With such an operation, when a destination radio station or a radio station that cannot be avoided on a route is a bottleneck radio station, each radio station selects a route including a radio station whose link with the bottle neck radio station is good in radio quality as an optimum route. Then, the selection of a route including a radio station whose link with the bottleneck radio station is good in radio quality indicates the selection of a radio station near to the bottleneck radio station as a relay station. Consequently, it is possible to reduce the number of hidden nodes for the relay radio station. In this manner, it is possible to reduce a probability of reception failure at the bottleneck radio station due to the hidden node problem, and accordingly reduce the number of times of retransmission. Thus, it is possible to prevent the decrease of a communication speed even when the selected route includes a bottleneck radio station. Moreover, the decrease of the number of times of retransmission can decrease the amount of interference to transmission from another radio station to the bottleneck radio station. Thus, it is possible to prevent the decrease of communication capacity of the network even when the selected route includes a bottleneck radio station.

For example, in the network illustrated in FIG. 1, to construct a route to the GW radio station 1, the GW radio station 1 broadcasts a routing information packet first. The radio stations 3 to 8 in the communicable range 101 of the GW radio station 1 receive the routing information packet. Each of the radio stations 3 to 8 having received the routing information packet calculates a routing cost to the GW radio station 1 in the calculation method of the embodiment. To be more specific, traffic is concentrated at the GW radio station 1, and thus each of the radio stations 3 to 8 multiplies a radio quality cost of the link with the GW radio station 1 by a weighting factor $\alpha$ ($\alpha$>1), and regards the result as a link cost of the link with the GW radio station 1. For example, the link cost of the link with the GW radio station 1 obtained by the radio station 3 is cost(3-1)×$\alpha$. Moreover, the link cost of the link with the GW radio station 1 obtained by the radio station 4 is cost(4-1)×$\alpha$. Then, each of the radio stations 3 to 8 broadcasts a routing information packet including the link cost obtained by the calculation as a routing cost.

Moreover, the radio station 2 having received a routing information packet from each radio stations positioned in the communicable range of the own station (corresponding to the radio stations 3 and 4 in FIG. 1) calculates link costs of links to the radio stations 3 and 4. To be more specific, traffic is not concentrated at the radio station 3 or 4, and thus the radio station 2 calculates respective radio quality costs based on the radio quality of the links to the radio stations 3 and 4 and regards the obtained radio quality costs as link costs. Here, cost(2-3) is obtained as a link cost of the link with the radio station 3, and cost(2-4) is obtained as a link cost of the link with the radio station 4.

Then, the radio station 2 calculates routing costs from the destination radio station to the own station by adding each link cost to the routing cost in the routing information packet used for the calculation of the link cost, and regards a route with the lowest total routing cost as an optimum route. For example, the radio station 2 compares a first routing cost obtained by adding a link cost cost(2-3) to a routing cost cost(3-1)×$\alpha$ obtained from the radio station 3 with a second routing cost obtained by adding a link cost cost(2-4) to a link cost cost(4-1)×$\alpha$ obtained from the radio station 4. As a result of the comparison, the radio station 2 regards a route with the lower cost as an optimum route.

For example, in the network illustrated in FIG. 1, the radio station 4 is nearer to the GW radio station 1 than the radio station 3. Thus, the radio quality between the radio station 4 and the GW radio station 1 is better than the radio quality between the radio station 3 and the GW radio station 1. For this reason, in the embodiment, a weighting factor $\alpha$ ($\alpha$>1) is set preliminarily so that the radio station 2 can select the radio station 4 whose link with the GW radio station 1 is good in radio quality as a relay radio station. In the embodiment, an appropriate weighting factor $\alpha$ is set so that the routing cost of the route (2-4-1) becomes lower than the routing cost of the route (2-3-1) using the increase of a difference between the link costs by multiplication of a weighting factor $\alpha$. In this manner, the radio station 2 can select the route (2-4-1) including the radio station 4 as an optimum route from the GW radio station 1 to the own station. That is, in the embodiment, a weighting factor $\alpha$ with which the above-mentioned second routing cost is lower than the above-mentioned first routing cost is set preliminarily, whereby the radio station 2 selects the route (2-4-1) including the radio station 4 whose link with the GW radio station 1 is good in radio quality as an optimum route.

Then, the radio station 2 stores the routing cost of the route (2-4-1) to the GW radio station 1 in a routing information packet and broadcasts it.

Figure 3:
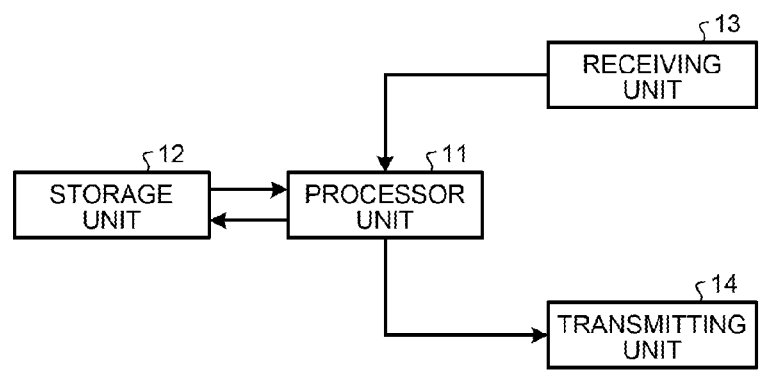
FIG. 3 is a diagram illustrating an example of a hardware configuration of a radio station.

Subsequently, the configuration of the radio station (the GW radio station 1 and the radio stations 2 to 8) of the embodiment is described in detail with reference to the drawings. FIG. 3 is a diagram illustrating an example of a hardware configuration of the radio station of the embodiment. In FIG. 3, the radio station of the embodiment includes a processor unit 11 including a CPU (central processing unit) and an FPGA (field programmable gate array), for example, and a storage unit 12 including a memory such as a ROM and a RAM. Moreover, the radio station of the embodiment includes a receiving unit 13 and a transmitting unit 14 that include FPGAs, for example, and perform transmission and reception of radio signals.

The processor unit 11 executes a computer program for routing, for example, of the embodiment. The storage unit 12 stores various computer programs such as the program for routing of the embodiment, data obtained during processing, for example. The processor unit 11 reads out such programs from the storage unit 12 and executes them.

Figure 4:
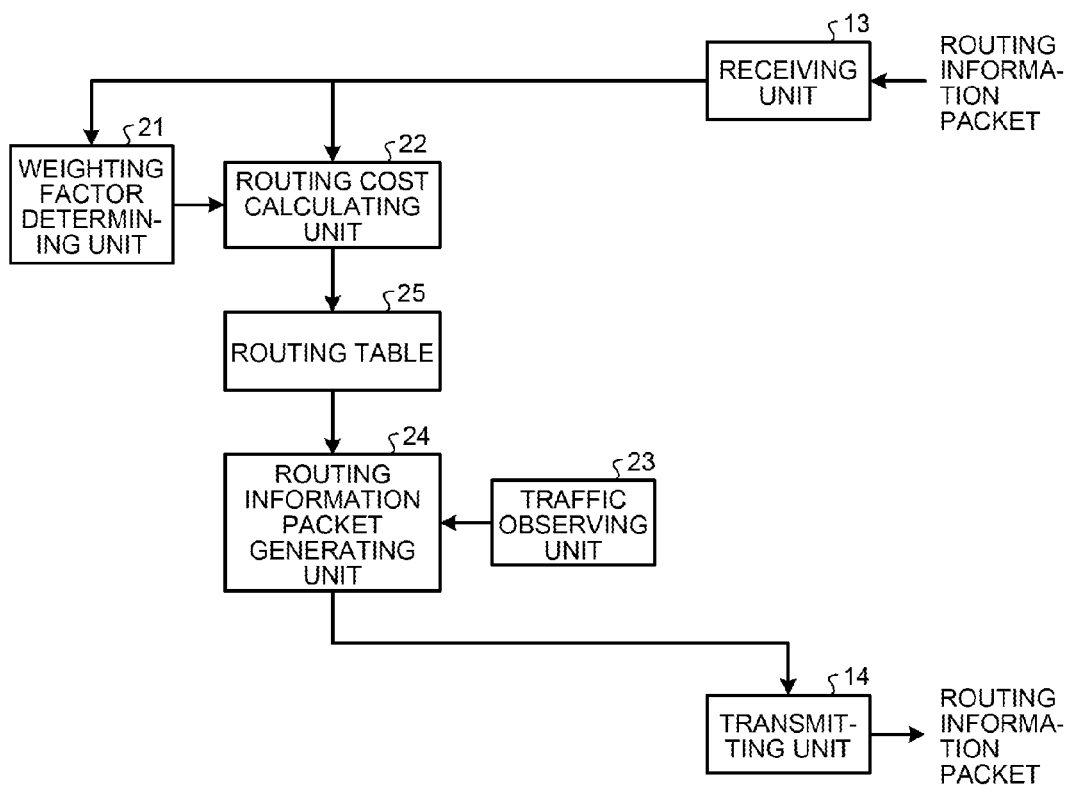
FIG. 4 is a diagram illustrating an example of a functional block configuration of a radio station.

FIG. 4 is a diagram illustrating an example of a functional block configuration of the radio station of the embodiment. In FIG. 4, the radio station of the embodiment includes a weighting factor determining unit 21, a routing cost calculating unit 22, a traffic observing unit 23, a routing information packet generating unit 24, and a routing table 25. The weighting factor determining unit 21, the routing cost calculating unit 22, the traffic observing unit 23, and the routing information packet generating unit 24 correspond to the processor unit 11 of FIG. 3 described above. Moreover, the routing table 25 corresponds to the storage unit 12 of FIG. 3 described above.

The weighting factor determining unit 21 determines a weighting factor based on traffic information included in a routing information packet received through the receiving unit 13. The routing cost calculating unit 22 calculates a routing cost using the weighting factor. The traffic observing unit 23 observes traffic of the own station. The routing information packet generating unit 24 generates a routing information packet that includes traffic information of the own station and routing information from the own station to a destination radio station registered in the routing table 25, and broadcasts it through the transmitting unit 14.

Note that the hardware configuration and functional block configuration of the radio station of the embodiment that are described above illustrate configurations related to processing of the embodiment for the convenience of explanation, and does not illustrate all functions of the radio station.

Next, the operation of the radio station of the embodiment is described. When the traffic amount of an adjacent radio station positioned in a communicable range of the own station exceeds a given threshold, the radio station of the embodiment determines that traffic is concentrated at the adjacent radio station. Then, the radio station multiplies a radio quality cost obtained based on the radio quality of a link with the adjacent radio station by a weighting factor α (α>1), and regards the result as a link cost. When the traffic amount of an adjacent radio station positioned in a communicable range of the own station is equal to or smaller than the given threshold, the radio station of the embodiment determines that traffic is not concentrated at the adjacent radio station. Then, the radio station calculates a radio quality cost based on the radio quality of a link with the adjacent radio station, and regards the result as a link cost. Note that the given threshold described above is set as appropriate depending on an experience value of the network operation, the characteristics of the radio system, etc. Moreover, the weighting factor α described above is of the same value among radio stations constituting a wireless ad hoc network.

Figure 5:
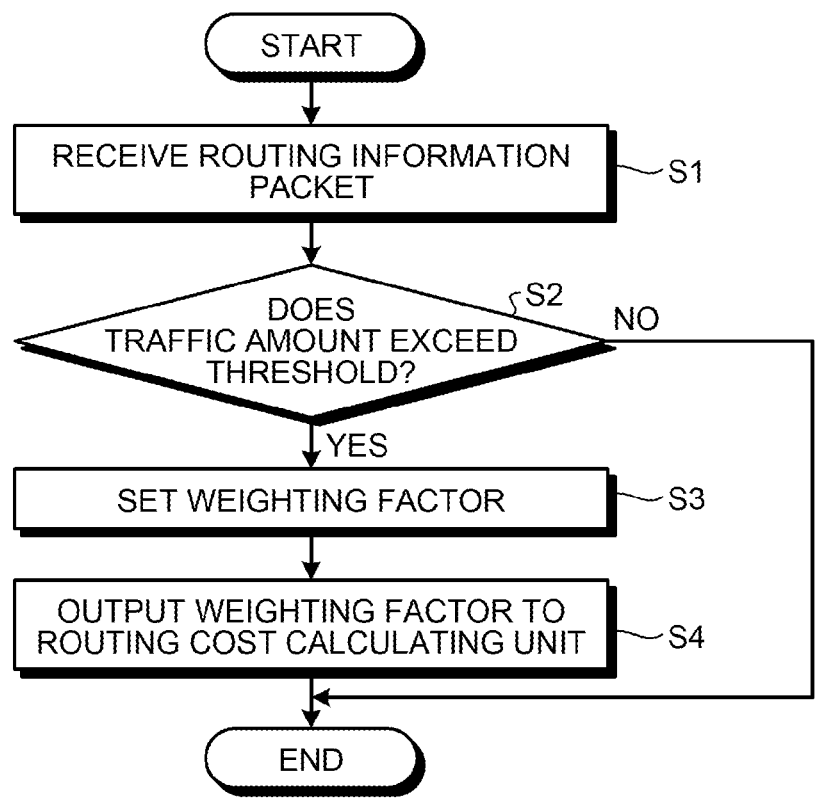
FIG. 5 is a flowchart illustrating operations of a weighting factor determining unit.

The following describes the operation above in detail with reference to the drawings. FIG. 5 is a flowchart illustrating operations of the weighting factor determining unit 21. First, the weighting factor determining unit 21 receives a routing information packet transmitted by an adjacent radio station through the receiving unit 13 (S1), and obtains traffic information of the adjacent radio station from the routing information packet. Next, the weighting factor determining unit 21 compares a traffic amount obtained from the traffic information with a given threshold (S2). For example, when the traffic amount exceeds the threshold (Yes at S2), the weighting factor determining unit 21 sets a fixed weighting factor α (S3) and outputs the weighting factor α to the routing cost calculating unit 22 (S4). When the traffic amount is equal to or smaller than the threshold (No at S2), the weighting factor determining unit 21 does not set a weighting factor and finishes the processing.

Figure 6:
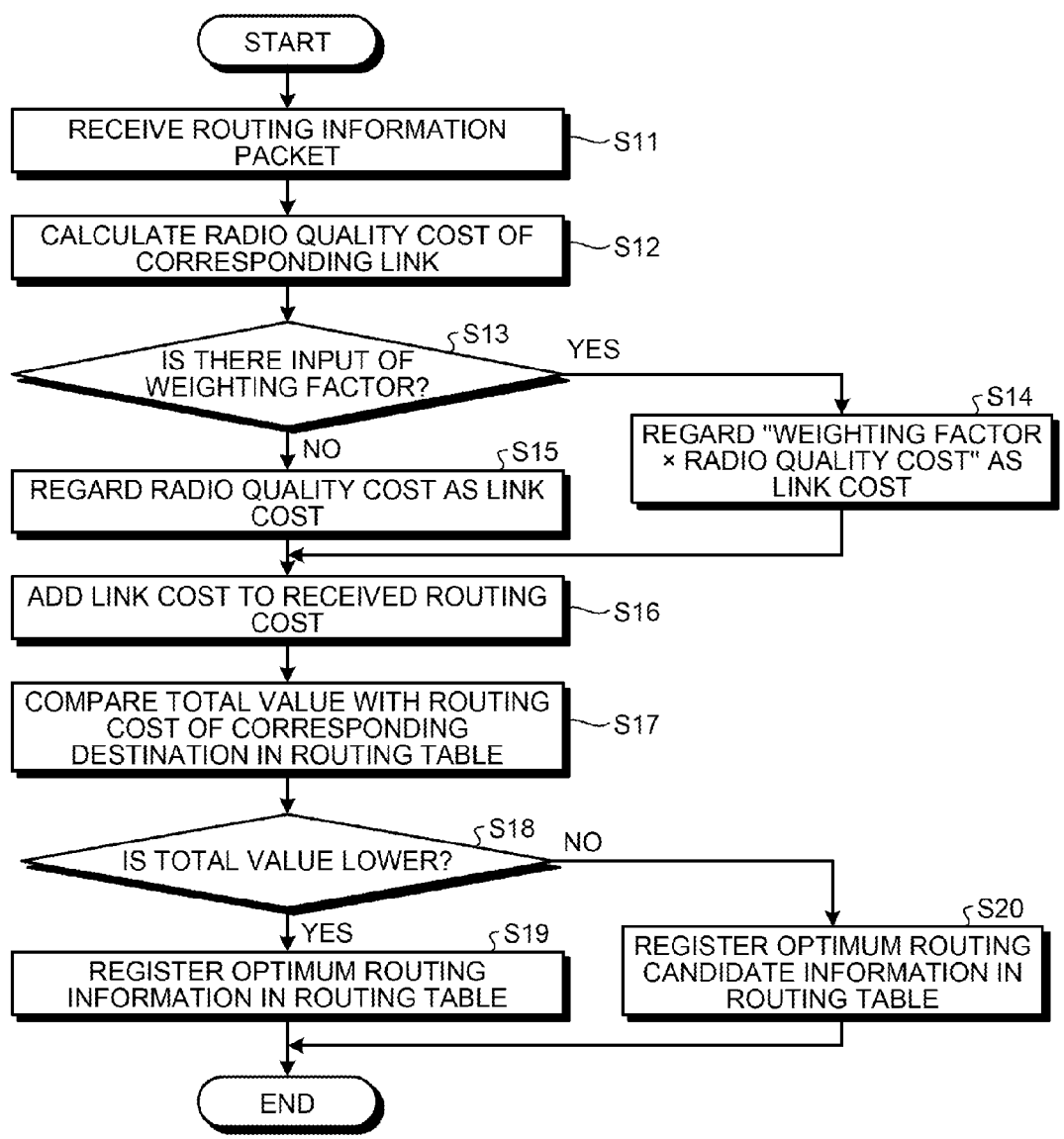
FIG. 6 is a flowchart illustrating operations of a routing cost calculating unit.

FIG. 6 is a flowchart illustrating operations of the routing cost calculating unit 22. The routing cost calculating unit 22 receives a routing information packet transmitted by an adjacent radio station through the receiving unit 13 (S11), and calculates a radio quality cost based on the radio quality of a link with the radio station having transmitted the routing information packet (S12). The radio quality cost may be calculated based on the radio quality of the received routing information packet or calculated based on an average value of the radio quality of routing information packets received in a certain period of time, for example. Moreover, the radio quality may include a received power value and an SNR (signal to noise ratio), for example.

Next, the routing cost calculating unit 22 checks for an input of a weighting factor α from the weighting factor determining unit 21 (S13). When there is an input of the weighting factor α (Yes at S13), the routing cost calculating unit 22 multiplies the weighting factor α by the radio quality cost, and regards the result as a link cost (S14). When there is no input of a weighting factor α (No at S13), the routing cost calculating unit 22 regards the radio quality cost as a link cost (S15). Then, the routing cost calculating unit 22 adds the link cost to the routing cost to the destination radio station obtained from the received routing information packet, and regards the addition result as a routing cost from the own station to the destination radio station (S16).

Next, the routing cost calculating unit 22 compares the routing cost obtained at S16 with a routing cost from the own station to the destination radio station that is registered in the routing table 25 (S17). For example, when the routing cost obtained at S16 is lower (Yes at S18), the routing cost calculating unit 22 registers a route corresponding to the routing cost obtained at S16 as an optimum route in the routing table 25 (S19). Moreover, the routing cost calculating unit 22 registers the routing cost obtained at S16 as a routing cost of the optimum route in the routing table 25 (S19). When the routing cost obtained at S16 is higher (No at S18), the routing cost calculating unit 22 registers a route corresponding to the routing cost obtained at S16 as a candidate for an optimum route in the routing table 25 (S20). Moreover, the routing cost calculating unit 22 registers the routing cost obtained at S16 as a candidate for a routing cost of an optimum route in the routing table 25 (S20). Note that when no route from the own station to the destination radio station is registered in the routing table 25 at S17, the routing cost calculating unit 22 registers a route corresponding to the routing cost obtained at S16 as an optimum route, and registers the routing cost as a routing cost of the optimum route.

Figure 7:
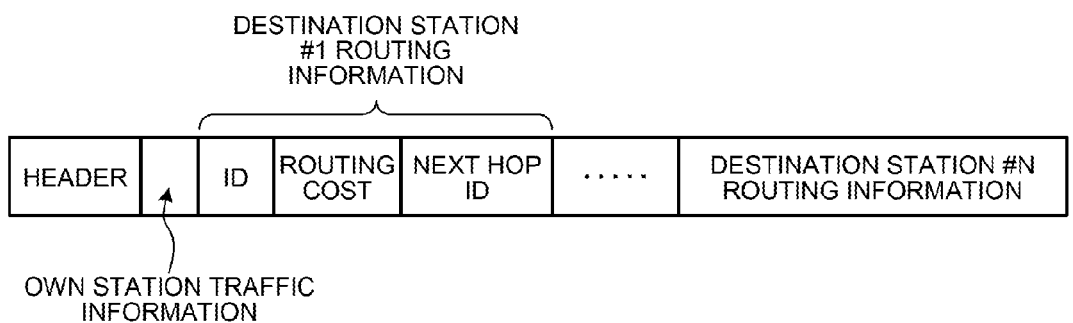
FIG. 7 is a diagram illustrating an example of a format of a routing information packet.

Subsequently, the operations of the traffic observing unit 23 and the routing information packet generating unit 24 are described. The traffic observing unit 23 observes traffic of the own station, and notifies the routing information packet generating unit 24 of traffic information as the observation result. Note that the traffic information may include the number of times of transmission and reception in a unit of time, a time use rate of a channel, an accumulation data amount of a buffer, etc. The routing information packet generating unit 24 generates a routing information packet including traffic information received from the traffic observing unit 23 and routing information (route, routing cost) read out from the routing table 25. FIG. 7 is a diagram illustrating an example of a format of a routing information packet. The routing information packet generating unit 24 generates a routing information packet including traffic information of the own station and routing information from the own station to each destination radio station (destination stations #1 to #N: N is a natural number) that is registered in the routing table 25. Note that the routing information includes an identifier (ID) of a destination station, a routing cost, a next hop transfer destination ID, etc. Moreover, the routing information packet also includes header information, etc.

As described above, in a wireless ad hoc network, when traffic of an adjacent radio station exceeds a certain threshold, each radio station determines that traffic is concentrated at the adjacent radio station. Then, the radio station multiplies a radio quality cost obtained based on the radio quality of a link with the adjacent radio station by a weighting factor α, and regards the result as a link cost. When traffic of the adjacent radio station is equal to or smaller than the certain threshold, each radio station determines that traffic is not concentrated at the adjacent radio station. Then, the radio station calculates a radio quality cost based on the radio quality of a link with the adjacent radio station, and regards the result as a link cost. Next, each radio station adds the link cost obtained in the manner above to a routing cost from the adjacent radio station to the destination radio station to calculate a routing cost from the own station to a destination radio station. Each radio station performs the processing above for all of the adjacent radio stations, and selects a route with the lowest routing cost from the own station to the destination radio station as an optimum route.

In this manner, when a destination radio station or a radio station that cannot be avoided on a route is a bottleneck radio station, each radio station selects a route including a radio station whose link with the bottleneck radio station is good in radio quality as an optimum route. That is, in the embodiment, a radio station near to the bottleneck radio station is selected as a relay radio station, which reduces the number of hidden nodes for the relay radio station. Thus, it is possible to reduce a probability of reception failure at the bottleneck radio station due to the hidden node problem. Moreover, the number of times of retransmission can be reduced accordingly, whereby it is possible to prevent the decrease of a communication speed even when the selected route includes a bottleneck radio station. Moreover, the decrease of the number of times of retransmission can also reduce the amount of interference to transmission from another radio station to the bottleneck radio station, whereby it is possible to prevent the decrease of communication capacity of the network even when the selected route includes a bottleneck radio station.

In the embodiment, the routing cost of a route including a bottleneck radio station becomes higher by the multiplication of a link cost by a weighting factor $\alpha$. Thus, when there is a detour avoiding the bottleneck radio station, for example, the detour can be selected as an optimum route. In this manner, it is possible to achieve the dispersion of traffic.

[b] Second Embodiment

The following describes a radio station and a routing method of second embodiment. Note that the configuration of a wireless ad hock network of the second embodiment is the same as in FIG. 1 of the first embodiment described above. Moreover, the hardware configuration and functional block configuration of the radio station in the second embodiment are the same as in FIG. 3 and FIG. 4 of the first embodiment described above. In the second embodiment, the operation different from in the first embodiment is described.

The radio station of the second embodiment has a plurality of thresholds to allocate a traffic amount into graded levels, and sets an appropriate weighting factor $\alpha_1, \alpha_2, \alpha_3, \ldots$ ($1<\alpha_1<\alpha_2<\alpha_3 \ldots$) every time the threshold is exceeded with the increase of the traffic amount of an adjacent radio station. Then, the radio station multiplies a radio quality cost obtained based on the radio quality of a link with the adjacent radio station by the weighting factor $\alpha_1, \alpha_2, \alpha_3, \ldots$ in accordance with the traffic amount, and regards the result as a link cost. When the traffic amount of the adjacent radio station is equal to or smaller than the lowest threshold, the radio station of the second embodiment determines that traffic is not concentrated at the adjacent radio station. Then, the radio station calculates a radio quality cost based on the radio quality of a link with the adjacent radio station, and regards the result as a link cost. Moreover, each of the above-mentioned $\alpha_1, \alpha_2, \alpha_3, \ldots$ is of the same value among radio stations constituting the wireless ad hoc network.

Figure 8:
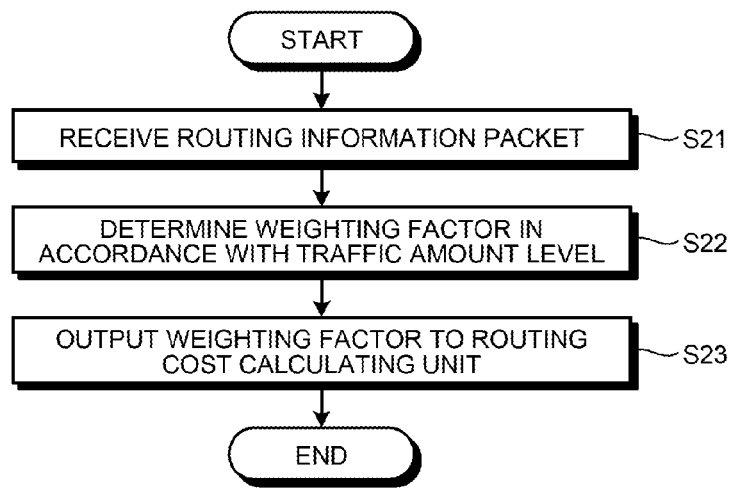
FIG. 8 is a flowchart illustrating operations of a weighting factor determining unit.

Subsequently, the operation above is described in detail with reference to the drawings. FIG. 8 is a flowchart illustrating operations of the weighting factor determining unit 21. First, the weighting factor determining unit 21 receives a routing information packet transmitted by an adjacent radio station through the receiving unit 13 (S21), and obtains traffic information of the adjacent radio station from the routing information packet. Next, the weighting factor determining unit 21 compares a traffic amount obtained from the traffic information with the above-mentioned thresholds, and selects a weighting factor ($1, \alpha_1, \alpha_2, \alpha_3, \ldots$) in accordance with the traffic amount (S22). Note that 1 as the weighting factor is selected when it is determined that traffic is not concentrated. Next, the weighting factor determining unit 21 outputs the selected weighting factor to the routing cost calculating unit 22 (S23). Note that the other operations are the same as in the first embodiment described above.

As described in the above, the radio station of the second embodiment has a plurality of thresholds to allocate a traffic amount into graded levels instead of the given threshold in the first embodiment. Moreover, the radio station of the second embodiment sets an appropriate weighting factor $\alpha_1, \alpha_2, \alpha_3, \ldots$ ($1<\alpha_1<\alpha_2<\alpha_3 \ldots$) based on the comparison result between the traffic amount of an adjacent radio station and the plurality of thresholds. Then, the radio station multiplies the radio quality cost obtained based on the radio quality of a link with the adjacent radio station by a weighting factor $\alpha_1, \alpha_2, \alpha_3, \ldots$ in accordance with the traffic amount, and regards the result as a link cost. In this manner, in addition to the effects in the first embodiment, it is possible to construct an optimum route in accordance with the traffic amount.

According to an aspect of the radio station disclosed in the present application, it is possible to reduce reception failure due to the hidden node problem when it is impossible to construct a route avoiding a bottleneck radio station.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio station that selects a route whose routing cost to a destination that is a total amount of link costs is lowest as an optimum route in an ad hoc network, the radio station comprising:

a receiver configured to receive a routing information packet from an adjacent radio station which observes traffic amount of the adjacent radio station and generates the routing information packet including information on the traffic amount of the adjacent radio station and a routing cost from the adjacent radio station to the destination; and a processor connected to the receiver, wherein the processor executes a process including:

obtaining the traffic amount of the adjacent radio station from the received routing information packet;

outputting a value larger than one as a weighting factor when the traffic amount of the adjacent radio station exceeds a certain threshold;

calculating a radio quality cost based on radio quality for each link between the radio station and each adjacent radio station; and regarding a multiplication result of the obtained radio quality cost and the weighting factor as a link cost when the weighting factor is output, and regarding the obtained radio quality cost as a link cost when the weighting factor is not output.

2. The radio station according to claim 1, wherein the process further includes adding the link cost of a link with the adjacent radio station to the routing cost included in the routing information packet, and regarding the addition result as a routing cost from the radio station to the destination.

3. The radio station according to claim 2, wherein the process further includes:
  observing a traffic amount of the radio station; and
  generatinq a routing information packet including the routing cost from the radio station to the destination and the traffic amount of the radio station, and broadcasting the routing information packet.

4. The radio station according to claim 1, wherein the outputting includes comparing the traffic amount of the adjacent radio station with a plurality of thresholds to allocate the traffic amount into graded levels and outputting the weighting factor in accordance with the traffic amount allocated into the graded levels based on a comparison result between the traffic amount of the adjacent radio station and the thresholds.

5. A routing method executed by each radio station in an ad hoc network, the routing method comprising:
  receiving a routing information packet from an adjacent radio station which observes traffic amount of the adjacent radio station and generates the routing information packet including information on the traffic amount of the adjacent radio station and a routing cost from the adjacent radio station to a destination radio station;
  obtaining the traffic amount of the adjacent radio station from the received routing information packet;
  determining a value larger than one as a weighting factor when the traffic amount of the adjacent radio station exceeds a certain threshold;
  calculating a radio quality cost based on radio quality for each link between own station and each adjacent radio station, regarding a multiplication result of the obtained radio quality cost and the weighting factor as a link cost when the weighting factor is determined, and regarding the obtained radio quality cost as a link cost when no weighting factor is determined;
  adding the link cost of a link with the adjacent radio station to the routing cost from the adjacent radio station to the destination radio station, and regarding the addition result as a routing cost from the own station to the destination radio station; and
  selecting a route with a lowest routing cost from the own station to the destination radio station as an optimum route.

6. The routing method according to claim 5, further comprising:
  observing a traffic amount of the own station; and
  broadcasting a routing information packet including the routing cost from the own station to the destination radio station and the traffic amount of the own station.

7. The routing method according to claim 5, wherein each radio station has a plurality of thresholds to allocate a traffic amount into graded levels as the given threshold, and outputs the weighting factor in accordance with a traffic amount allocated into graded levels based on a comparison result between the traffic amount of the adjacent radio station and the thresholds.

8. A radio communication system in which each radio station selects a route whose routing cost to a destination radio station that is a total amount of link costs is lowest as an optimum route in an ad hoc network, wherein
  a radio station comprises:
  a receiver configured to receive a routing information packet from an adjacent radio station which observes traffic amount of the adjacent radio station and generates the routing information packet including information on the traffic amount of the adjacent radio station and a routing cost from the adjacent radio station to the destination radio station; and
  a processor connected to the receiver, wherein the processor executes a process including:
  obtaining the traffic amount of the adjacent radio station from the received routing information packet;
  outputting a value larger than one as a weighting factor when the traffic amount of the adjacent radio station exceeds a certain threshold;
  calculating a radio quality cost based on radio quality for each link between the radio station and each adjacent radio station; and
  regarding a multiplication result of the obtained radio quality cost and the weighting factor as a link cost when the weighting factor is output, and regarding the obtained radio quality cost as a link cost when the weighting factor is not output.

9. The radio communication system according to claim 8, wherein the process further includes adding the link cost of a link with the adjacent radio station to the routing cost included in the routing information packet, and regarding the addition result as a routing cost from the radio station to the destination radio station.

10. The radio communication system according to claim 9, wherein the process further includes:
  observing a traffic amount of the radio station; and
  generating a routing information packet including the routing cost from the radio station to the destination radio station and the traffic amount of the radio station, and broadcasting the routing information packet.

11. The radio communication system according to claim 8, wherein the outputting includes comparing the traffic amount of the adjacent radio station with a plurality of thresholds to allocate the traffic amount into graded levels and outputting the weighting factor in accordance with the traffic amount allocated into the graded levels based on a comparison result between the traffic amount of the adjacent radio station and the thresholds.

* * * * *